(12) United States Patent
Paulson et al.

(10) Patent No.: US 10,703,460 B2
(45) Date of Patent: Jul. 7, 2020

(54) FOLDING SPINDLE AND BEARING ASSEMBLY IN A FOLDING ROTOR BLADE ASSEMBLY

(71) Applicant: Bell Helicopter Textron Inc., Fort Worth, TX (US)

(72) Inventors: Jared Mark Paulson, Fort Worth, TX (US); Tyler Wayne Baldwin, Keller, TX (US); Kyle Thomas Cravener, Watauga, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 297 days.

(21) Appl. No.: 15/845,967

(22) Filed: Dec. 18, 2017

(65) Prior Publication Data

US 2019/0185142 A1 Jun. 20, 2019

(51) Int. Cl.
*B64C 11/28* (2006.01)
*B64C 3/56* (2006.01)
*B64C 27/50* (2006.01)
*B64C 29/00* (2006.01)

(52) U.S. Cl.
CPC ............... *B64C 11/28* (2013.01); *B64C 3/56* (2013.01); *B64C 27/50* (2013.01); *B64C 29/0033* (2013.01)

(58) Field of Classification Search
CPC ......... B64C 11/02; B64C 11/12; B64C 11/28; B64C 27/39; B64C 27/35; B64C 27/33; B64C 27/48; B64C 27/08; B64C 27/14; B64C 27/82; B64C 27/605; B64C 27/50; B64C 27/52; B64C 3/56; B64C 29/0033
See application file for complete search history.

(56) References Cited

U.S. PATENT DOCUMENTS

| | | | |
|---|---|---|---|
| 2,623,713 | A | 12/1952 | Foster |
| 2,658,576 | A | 11/1953 | Mosinskis |
| 3,026,942 | A | 3/1962 | Cresap |
| 3,153,455 | A | 10/1964 | Mosinskis |
| 3,625,631 | A | 12/1971 | Covington, Jr. et al. |
| 3,652,185 | A | 3/1972 | Cresap et al. |
| 3,967,918 | A | 7/1976 | Mouille et al. |
| 4,252,504 | A | 2/1981 | Covington et al. |
| 4,257,739 | A | 3/1981 | Covington et al. |
| 4,268,222 | A | 5/1981 | Bernard |
| 4,427,340 | A | 1/1984 | Metzger et al. |
| 4,522,563 | A | 6/1985 | Reyes et al. |

(Continued)

OTHER PUBLICATIONS

Cravener, Kyle Thomas, "U.S. Appl. No. 15/963,516" filed Apr. 26, 2018.

(Continued)

*Primary Examiner* — Richard A Edgar
*Assistant Examiner* — Maxime M Adjagbe
(74) *Attorney, Agent, or Firm* — Ross T. Robinson

(57) ABSTRACT

A folding rotor blade assembly for a tiltrotor aircraft comprising a rotor blade pivotally connected to a grip with dual concentric blade bolts having a common central axis providing a pivotal axis inboard of an outboard bearing. A folding spindle connects the outboard bearing to an outboard tip of a yoke. The outboard bearing and the spindle fold with the rotor blade relative to the yoke. In use, the compact folded arrangement of the rotor blades reduces folded aircraft dimensions in response to ever increasing restricted storage space parameters.

17 Claims, 10 Drawing Sheets

(56) References Cited

U.S. PATENT DOCUMENTS

| | | | |
|---|---|---|---|
| 4,691,878 A | 9/1987 | Vaughan et al. | |
| 5,031,858 A | 7/1991 | Schellhase et al. | |
| 5,059,094 A * | 10/1991 | Robinson | B64C 27/33 |
| | | | 416/134 A |
| 5,096,380 A | 3/1992 | Byrnes et al. | |
| 5,337,974 A | 8/1994 | Rumberger et al. | |
| 5,358,381 A | 10/1994 | Covington et al. | |
| 5,645,400 A | 7/1997 | Hunter et al. | |
| 6,036,442 A * | 3/2000 | Certain | B64C 27/50 |
| | | | 416/143 |
| 7,530,790 B2 | 5/2009 | Cabrera et al. | |
| 8,360,727 B2 | 1/2013 | Stamps et al. | |
| 9,156,545 B1 | 10/2015 | Fenny et al. | |
| 9,169,010 B2 | 10/2015 | Foskey et al. | |
| 9,499,262 B2 | 11/2016 | Foskey et al. | |
| 2004/0026564 A1 | 2/2004 | Romani et al. | |
| 2013/0149151 A1 | 6/2013 | Rauber et al. | |
| 2014/0271199 A1 | 9/2014 | Maresh et al. | |
| 2014/0271222 A1 | 9/2014 | Maresh et al. | |
| 2015/0125300 A1 | 5/2015 | Stamps et al. | |
| 2016/0152329 A1 | 6/2016 | Tzeng et al. | |
| 2017/0144746 A1 | 5/2017 | Schank et al. | |
| 2017/0320567 A1 | 11/2017 | Miller et al. | |
| 2018/0229830 A1 | 8/2018 | Foskey et al. | |
| 2018/0244377 A1 | 8/2018 | Chan | |

OTHER PUBLICATIONS

Paulson, Jared Mark, "U.S. Appl. No. 16/016,280" filed Jun. 22, 2018.

Paulson, Jared Mark, "U.S. Appl. No. 15/845,720" filed Dec. 18, 2017.

Paulson, Jared Mark, "U.S. Appl. No. 15/845,810" filed Dec. 18, 2017.

Paulson, Jared Mark, "U.S. Appl. No. 15/845,876" filed Dec. 18, 2017.

Paulson, Jared Mark, "U.S. Appl. No. 15/845,928" filed Dec. 18, 2017.

Paulson, Jared Mark, "U.S. Appl. No. 15/846,011" filed Dec. 18, 2017.

* cited by examiner

FOLDING SPINDLE AND BEARING ASSEMBLY IN A FOLDING ROTOR BLADE ASSEMBLY

CROSS-REFERENCE TO RELATED APPLICATIONS

This patent application is related to U.S. patent application Ser. No. 15/845,720, entitled "Split Yoke In A Folding Rotor Blade Assembly;" U.S. patent application Ser. No. 15/845,810, entitled "Compact Folding Yoke In A Folding Rotor Blade Assembly;" U.S. patent application Ser. No. 15/845,876, entitled "Compact Folding Yoke With Flexible Yoke Arms In A Folding Rotor Blade Assembly;" U.S. patent application Ser. No. 15/845,928, entitled "Dual Blade Fold Bolts And Inboard Centrifugal Bearing In A Folding Rotor Blade Assembly;" and U.S. patent application Ser. No. 15/846,011, entitled "Outboard Centrifugal Force Bearing With Inboard Blade Fold Axis In A Folding Rotor Blade Assembly;" Each patent application identified above is filed on the same date as this patent application and is incorporated herein by reference in its entirety.

BACKGROUND

This section provides background information to facilitate a better understanding of the various aspects of the disclosure. It should be understood that the statements in this section of this document are to be read in this light, and not as admissions of prior art.

Rotorcraft and tiltrotor aircraft are often transported or stored on vessels or in areas where storage space is limited. In order to reduce the space that each aircraft occupies such that the maximum number of aircraft can be accommodated within the limited storage space, the blade assemblies of some rotor systems can be folded so that each rotor blade is generally parallel with each other in order to reduce the overall profile of the blade assembly. Typically, each rotor blade is folded about a single pivot point positioned outboard of the yoke that attaches the rotor blade to the central drive mast. The single pivot point is also necessarily outboard of a set of inboard and outboard bearings that connect the rotor blade to the yoke. The distance between the inboard and outboard bearings is dependent on aircraft configuration where each configuration has an optimal distance for that particular aircraft's loads and dynamics. As a result, in order to not interfere with the bearings and preserve the optimal distance between the bearings, the pivot point of each rotor blade is typically at least that optimal distance out from the inboard connection of the rotor blade to the yoke.

In an effort to transport or store larger numbers of rotorcraft and tiltrotor aircraft, current naval vessels have reduced the allotted storage space available for each aircraft. Present rotor blade folding systems cannot accommodate the reduced space parameters. This requirement necessitates a tighter grouping of the rotor blades than is currently available by prior art rotor blade folding systems.

SUMMARY

An example folding rotor blade assembly for a tiltrotor aircraft includes a drive mast connected to a yoke, an inboard beam housing an inboard bearing, the inboard bearing connected to the yoke, an outboard beam housing an outboard bearing, the outboard bearing connected to the yoke outboard of the inboard bearing, a grip connected to the inboard beam, and a rotor blade connected to the grip at a pivotal connection positioned inboard of the outboard bearing.

An example folding rotor blade assembly includes a yoke including a yoke arm extending radially from a central aperture, a clamp plate connected to the yoke proximate the central aperture, an inboard bearing connected to the clamp plate and connected to an inboard beam, a grip connected to the inboard beam, a folding spindle connected to the yoke arm at a first pivotal connection, an outboard bearing connected to the folding spindle and an outboard beam, a rotor blade connected to the outboard beam, the rotor blade connected to the grip at a second pivotal connection, and the first pivotal connection and the second pivotal connection positioned inboard of the outboard bearing.

An example method includes pitching a rotor blade of a rotor blade assembly comprising an inboard bearing connected to a yoke and a grip, an outboard bearing connected to the yoke at a first pivotal connection providing a first pivot axis, and a rotor blade connected to the grip at a second pivotal connection providing a second pivot axis inboard of the outboard bearing, and rotating the rotor blade together with the outboard bearing around the first pivot axis and the second pivot axis.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
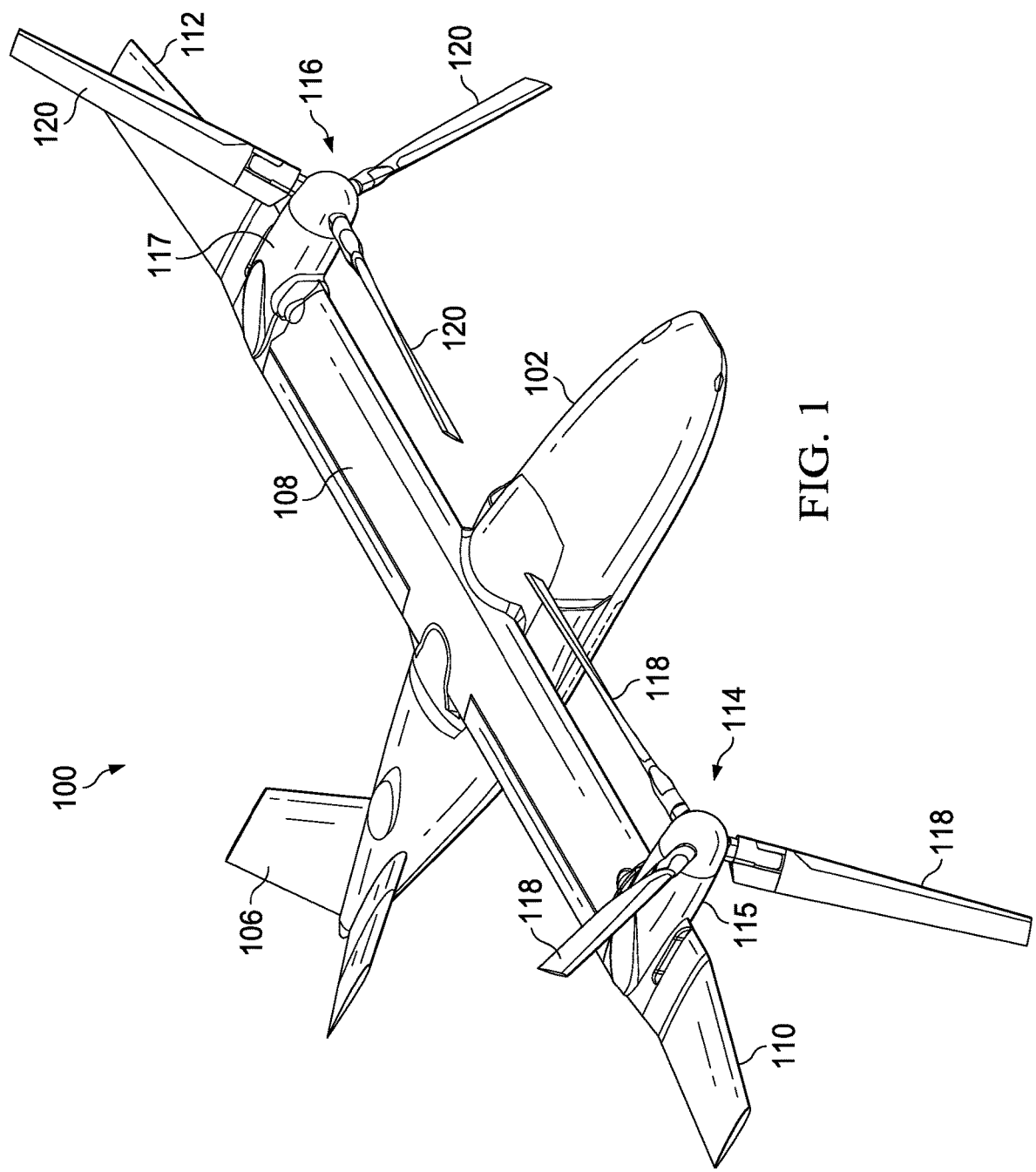
FIG. 1 is a perspective view of a tiltrotor aircraft in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 2:
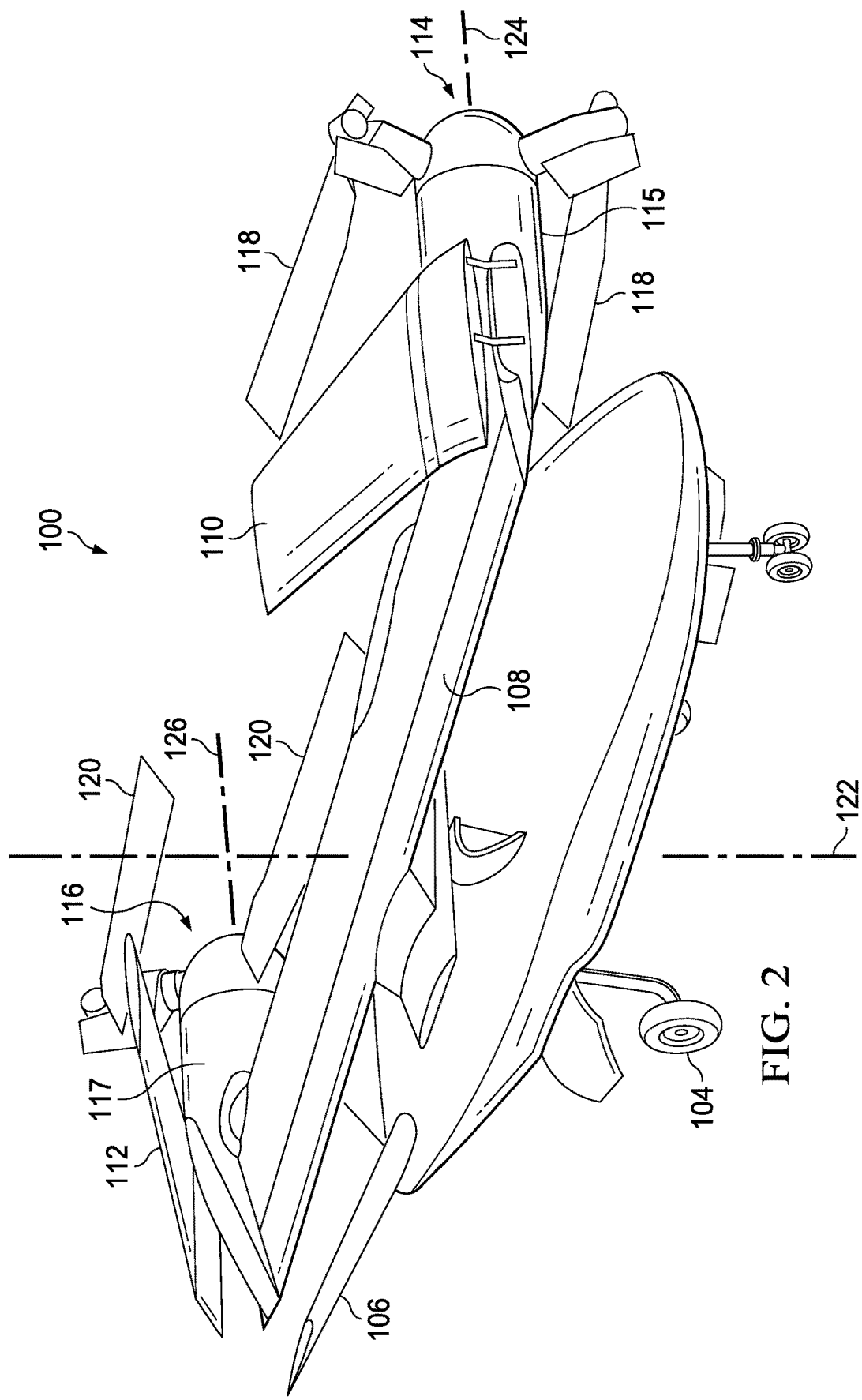
FIG. 2 is a perspective view of a tiltrotor aircraft in a stowed position according to aspects of the disclosure.

Referring to FIGS. 1 and 2, an illustrative tiltrotor aircraft 100 is shown. Tiltrotor aircraft 100 includes fuselage 102, landing gear 104, tail member 106, wing 108, wing tip 110, wing tip 112, rotor system 114, and rotor system 116. Rotor system 114 is housed within nacelle 115 located on an end portion of wing 108 proximate wing tip 110, while rotor system 116 is housed within nacelle 117 located on an opposite end portion of wing 108 proximate wing tip 112. Wing tip 110 is pivotable at a location on wing 108 outboard of nacelle 115. Wing tip 112 is pivotable at a location on wing 108 outboard of nacelle 117. Nacelles 115 and 117 are pivotable between a helicopter mode where the rotor systems are generally vertical and an airplane mode where the rotor systems are generally horizontal. Nacelle 115 and nacelle 117 are substantially symmetric of each other about fuselage 102. Rotor system 114 includes a plurality of foldable rotor blades 118. Rotor system 116 includes a plurality of foldable rotor blades 120. Rotor blades 118 and 120 may rotate in opposite directions to cancel the torque associated with the operation of each rotor system 114 and 116. The angle of the pivotable nacelles 115 and 117 relative to the wing, as well as the pitch of rotor blades 118 and 120, can be adjusted in order to selectively control direction, thrust, and lift of tiltrotor aircraft 100. Further, rotor systems 114 and 116 are illustrated in the context of tiltrotor aircraft 100; however, a singular rotor system with foldable rotor blades can be implemented on other non-tilting rotor and helicopter rotor systems. It should also be appreciated that teachings from tiltrotor aircraft 100 may apply to other aircraft such as airplanes and unmanned aircraft which would benefit from folding rotor blades.

Fuselage 102 represents the body of tiltrotor aircraft 100 and may be coupled to rotor systems 114 and 116 such that the rotor systems with rotor blades 118 and 120 may move tiltrotor aircraft 100 through the air. Landing gear 104 supports tiltrotor aircraft 100 when tiltrotor aircraft 100 is landing or when tiltrotor aircraft 100 is at rest on the ground. Vertical axis 122 is generally perpendicular to the longitudinal axis of the wing and is generally positioned at the intersection of the fuselage and the wing. FIG. 1 represents tiltrotor aircraft 100 in operational flying position in an airplane mode. FIG. 2 represents tiltrotor aircraft 100 in a stowed position where rotor blades 118 have been folded generally parallel with each other and rotor blades 120 have been folded generally parallel with each other in order to reduce the dimensions of the aircraft to whatever degree is required in response storage space restrictions. In the stowed position, wing 108 is swivelled approximately 90° to generally align with fuselage 102.

Generally each rotor system includes a mast driven by a power source. A rotor system includes a yoke connected to the mast and rotor blades indirectly connected to the yoke with bearings. The bearings are generally elastomeric bearings constructed from a rubber type material that absorb vibration. There may be inboard bearings connecting a cuff or grip of a rotor blade to the yoke proximate the mast and outboard bearings connecting the rotor blade to an outboard end of the yoke. The cuff or grip may be separate from the rotor blade or may be integrally formed with the rotor blade. Other combinations of inboard and outboard bearings with or without cuffs or grips are possible as well as the removal of one or the other bearings. The bearings accommodate forces acting on the rotor blades allowing each rotor blade to flex with respect to the yoke/mast and other rotor blades. The weight of the rotor blades and the lift of rotor blades may result in transverse forces on the yoke and other components. Examples of transverse forces may include forces resulting from flapping and coning of the rotor blades. Flapping generally refers to the up-and-down movement of a rotor blade positioned at a right angle to the plane of rotation. Coning generally refers to the upward flexing of a rotor blade due to lift forces acting on the rotor blade. The rotor blades may be subject to other forces, such as axial, lead/lag, and feathering forces. Axial forces generally refer to the centrifugal force on the rotor blades during rotation of the rotor blades. Lead and lag forces generally refer to forces resulting from the horizontal movement of the rotor blades about a vertical pin occurring if, for example, the rotor blades do not rotate at the same rate as the yoke. Feathering forces generally refer to forces resulting from twisting motions that cause a rotor blade to change pitch. The power source, mast, and yoke are components for transmitting torque. The power source may include a variety of components including an engine, a transmission, and differentials. In operation, the mast receives torque from the power source and rotates the yoke. Rotation of the yoke causes the rotor blades to rotate with the mast and yoke.

Figure 3:
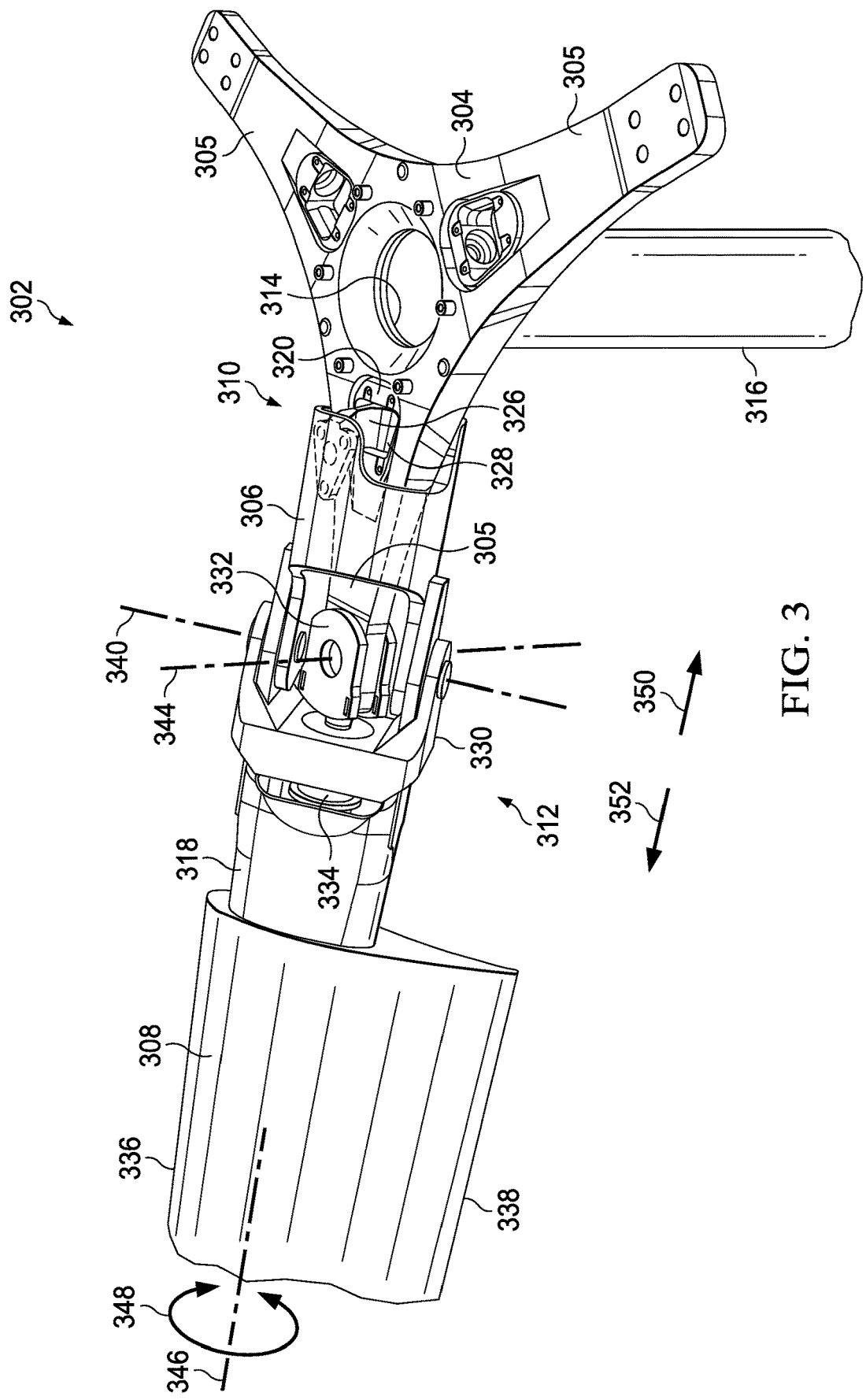
FIG. 3 is a partial exploded perspective view of a rotor blade assembly according to one or more aspects of the disclosure.

Referring to FIG. 3, rotor blade assembly 302 is shown in an unfolded position. Each rotor system 114 and 116 comprises a separate blade assembly. In the interest of clarity, a single blade assembly is described herein with the understanding that tiltrotor aircraft 100 comprises a pair of similarly configured blade assemblies. In the unfolded position, each rotor blade of blade assembly 302 is generally equally spaced from each other around a mast. For example, in the three rotor blade configuration shown, 120° separates each rotor blade. It should also be appreciated that teachings regarding blade assembly 302 can apply to blade assemblies having greater or fewer rotor blades.

Rotor blade assembly 302 includes yoke 304, grip 306, rotor blade 308, inboard bearing assembly 310, and outboard bearing assembly 312. Yoke 304 includes equally spaced extensions 305 extending radially from central aperture 314. A rotor blade is connected to yoke 304 at each extension. In the interest of clarity, a single connection between a yoke arm and a rotor blade is described herein with the understanding that rotor blade assembly 302 comprises a similarly configured connection for each extension, rotor blade interface.

Mast 316 is mounted to yoke 304 through central aperture 314 via a hub spring assembly. Rotor blade 308 has longitudinal axis 346. Rotor blade 308 includes cuff 318. A swash plate is connected to mast 316. A pitch link extends from the swash plate and connects to a pitch horn. The pitch horn is connected to grip 306. The swash plate, pitch link, and pitch horn are operatively connected to an actuator to pitch rotor blade 308 relative to yoke 304 in direction 348 about longitudinal axis 346. Longitudinal axis 346 may also be referred to as a blade pitch change axis. Each rotor blade may rotate or "pitch" about its longitudinal axis with respect to the yoke in a range between 0° to 90°.

Inboard bearing assembly 310 connects yoke 304 to grip 306. Inboard bearing assembly 310 includes clamp plate 320, inboard beam 326, and inboard bearing 328. Inboard bearing 328 is a shear bearing. Inboard beam 326 is connected to grip 306 and houses inboard bearing 328. Inboard bearing 328 extends from inboard beam 326 and is connected to clamp plate 320. Clamp plate 320 is mounted to yoke 304 proximate central aperture 314.

Rotor blade 308 is connected to grip 306 at a pivotal connection including pivot axis 340. Outboard bearing assembly 312 is connected to cuff 318 and yoke arm 305. Outboard bearing assembly 312 includes outboard beam 330, folding spindle 332, and outboard bearing 334. Outboard bearing 334 is a combination shear and centrifugal force ("CF") bearing. Outboard beam 330 is connected to cuff 318 and houses outboard bearing 334. Outboard beam 330 may be pivotally connected to cuff 318 at the pivotal connection including pivot axis 340. Folding spindle 332 is connected to a tip of yoke arm 305 at a pivotal connection including pivot axis 344. Outboard bearing 334 is connected to folding spindle 332. Inboard direction 350 points toward mast 316 of a blade assembly while outboard direction 352 points away from the mast along the longitudinal axis of a rotor blade. Pivot axis 344 is outboard of inboard bearing assembly 310. Pivot axis 344 is inboard of outboard bearing 334. The CF load path of rotor blade 308 is from rotor blade 308 to outboard beam 330 to folding spindle 332 to yoke 304. Pivot axes 340, 344 are on the CF path of rotor blade 308. Rotor blade 308 includes leading edge 336 and trailing edge 338.

Figure 4:
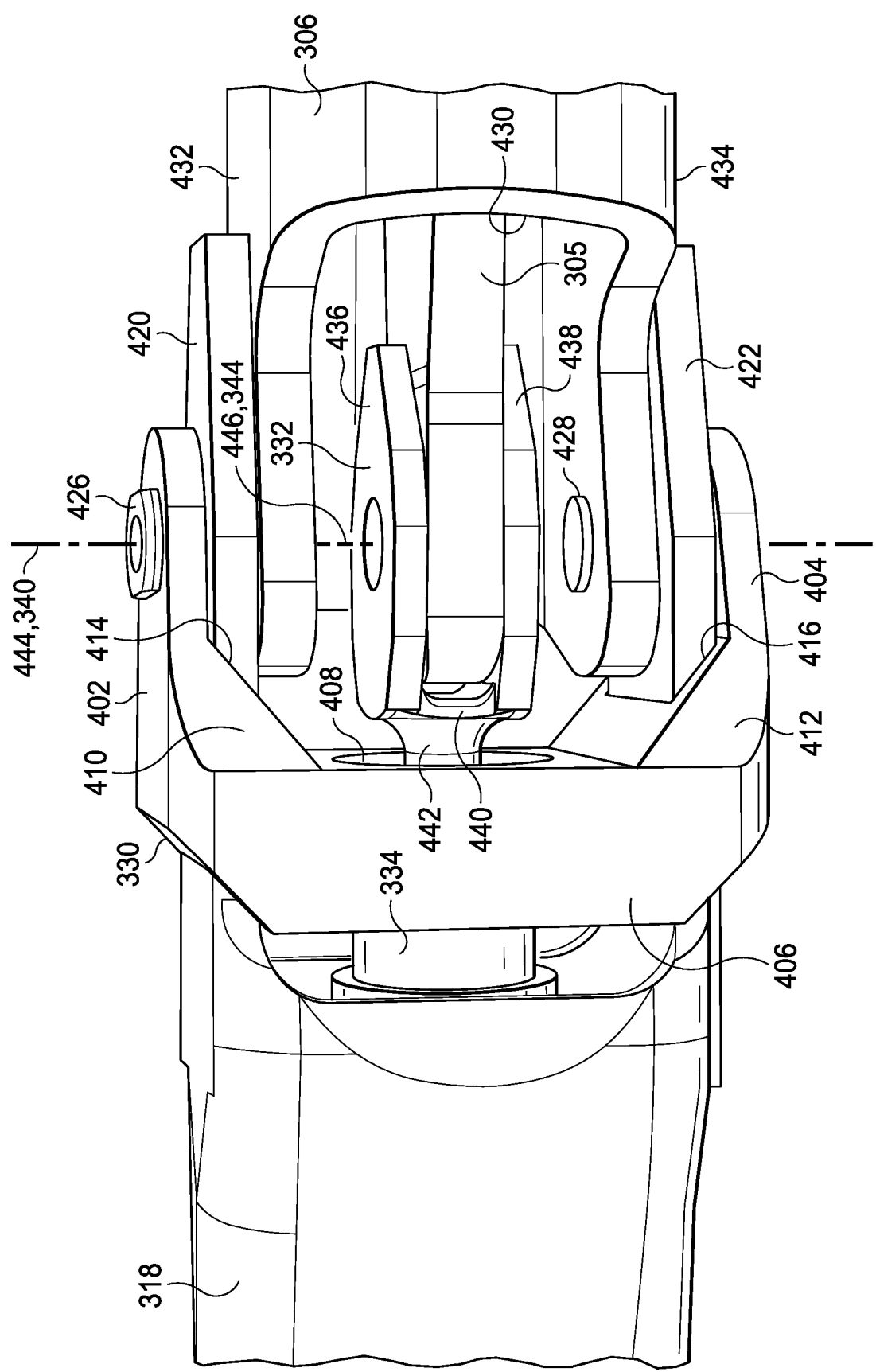
FIG. 4 is a partial perspective view of a pivotal connection of a rotor blade according to one or more aspects of the disclosure.

Referring to FIG. 4, an illustrative pivotal connection of a rotor blade to the yoke is shown. Outboard beam 330 is generally "C" shaped including flanges 402 and 404 extending generally perpendicularly from body 406. Body 406 includes passage 408. Angled section 410 connects flange 402 to body 406. Angled section 410 defines passage 414. Angled section 412 connects flange 404 to body 406. Angled section 412 defines passage 416. Cuff 318 includes blade tangs 420, 422. Blade tangs 420, 422 are sized to engage passages 414, 416, respectively. Blade tangs 420, 422 are connected to flanges 402, 404, respectively, with dual axially aligned blade bolts 426, 428, respectively. Blade bolts 426, 428 have a common central axis 444 that is collinear with pivot axis 340. Grip 306 defines cutout 430. Cutout 430 is positioned between surfaces 432, 434. Surfaces 432, 434 are exterior surfaces of grip 306. Blade bolts 426, 428 pivotally connect blade tangs 420, 422 to grip 306 at surfaces 432, 434. Blade tangs 420, 422 are exterior to grip 306. Outboard beam 330 and rotor blade 308 are free to rotate together around pivot axis 340 with respect to grip 306.

Folding spindle 332 is a clevis including vertically aligned prongs 436, 438 connected by bridge 440. The space between prongs 436, 438 is sized to engage yoke arm 305. Shaft 442 extends from bridge 440 through passage 408 to engage outboard bearing 334. Folding spindle 332 is pivotally connected to yoke arm 305 with a bolt including central axis 446 that is collinear with pivot axis 344. Folding spindle 332 is free to rotate around pivot axis 344 with respect to yoke arm 305. To reach a folded position (FIG. 9) the rotor blade, the outboard beam, the outboard bearing, and the folding spindle all rotate together with respect to the grip and the yoke.

Figure 5:
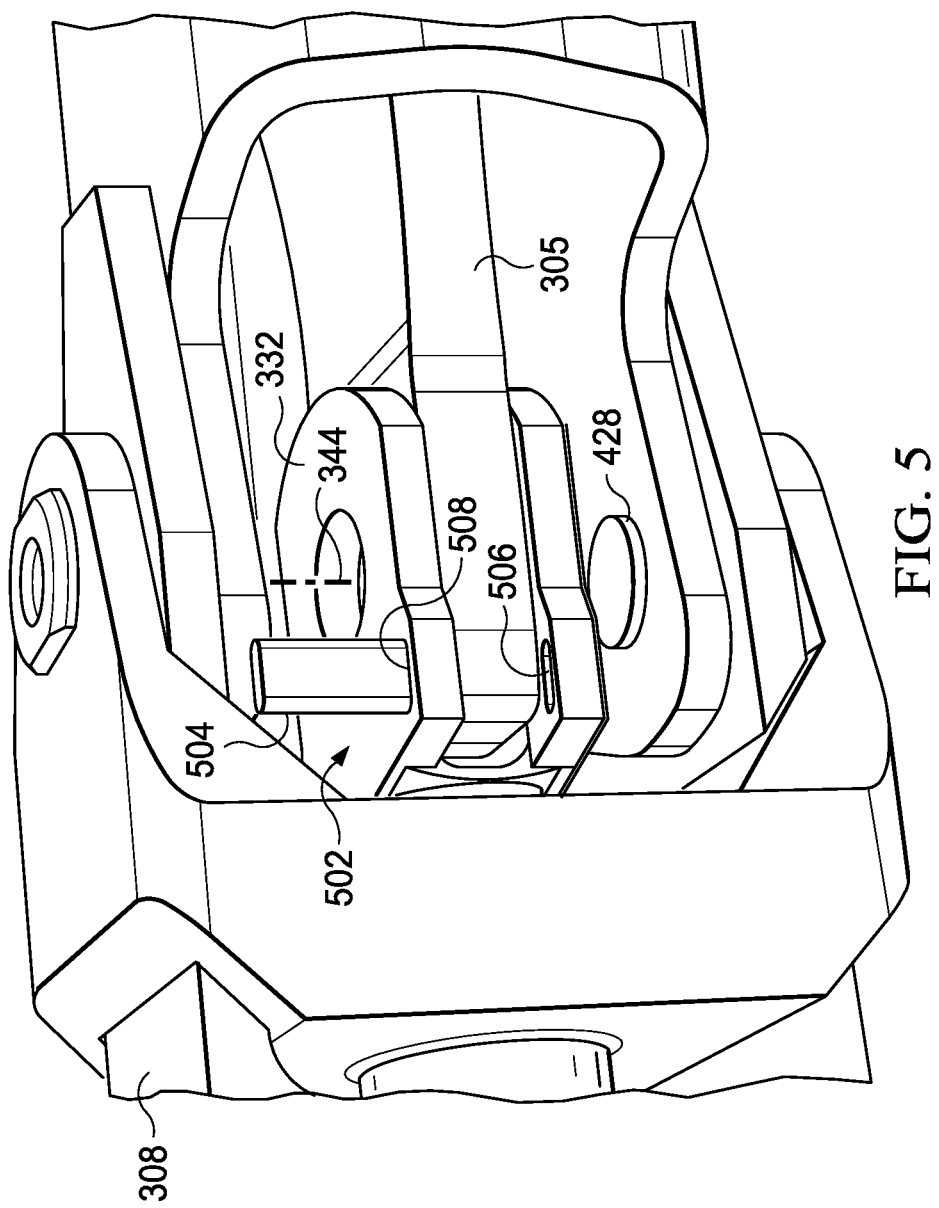
FIG. 5 is a partial perspective view of a lock mechanism of a rotor blade according to one or more aspects of the disclosure.

Referring to FIG. 5, rotor blade 308 is locked in the unfolded position by lock mechanism 502 (e.g., a tang lock, latch lock) attached to folding spindle 332. Lock mechanism 502 includes tab 504 sized and shaped to engage slots 506, 508. When tab 504 is simultaneously engaged with slots 506, 508, tab 504 abuts yoke arm 305 and prevents rotation of folding spindle 332 around pivot axis 344 with respect to the yoke. The lock mechanism locks folding spindle 332, thus the rotor blade, in the folded and unfolded positions and when unlocked, allows each rotor blade to rotate relative to the yoke. Actuators are operatively connected to lock mechanism 502 to move tab 504 in and out of engagement with slots 506, 508. Lock mechanism 502 locks/unlocks the rotor blades to the yoke.

Figure 6:
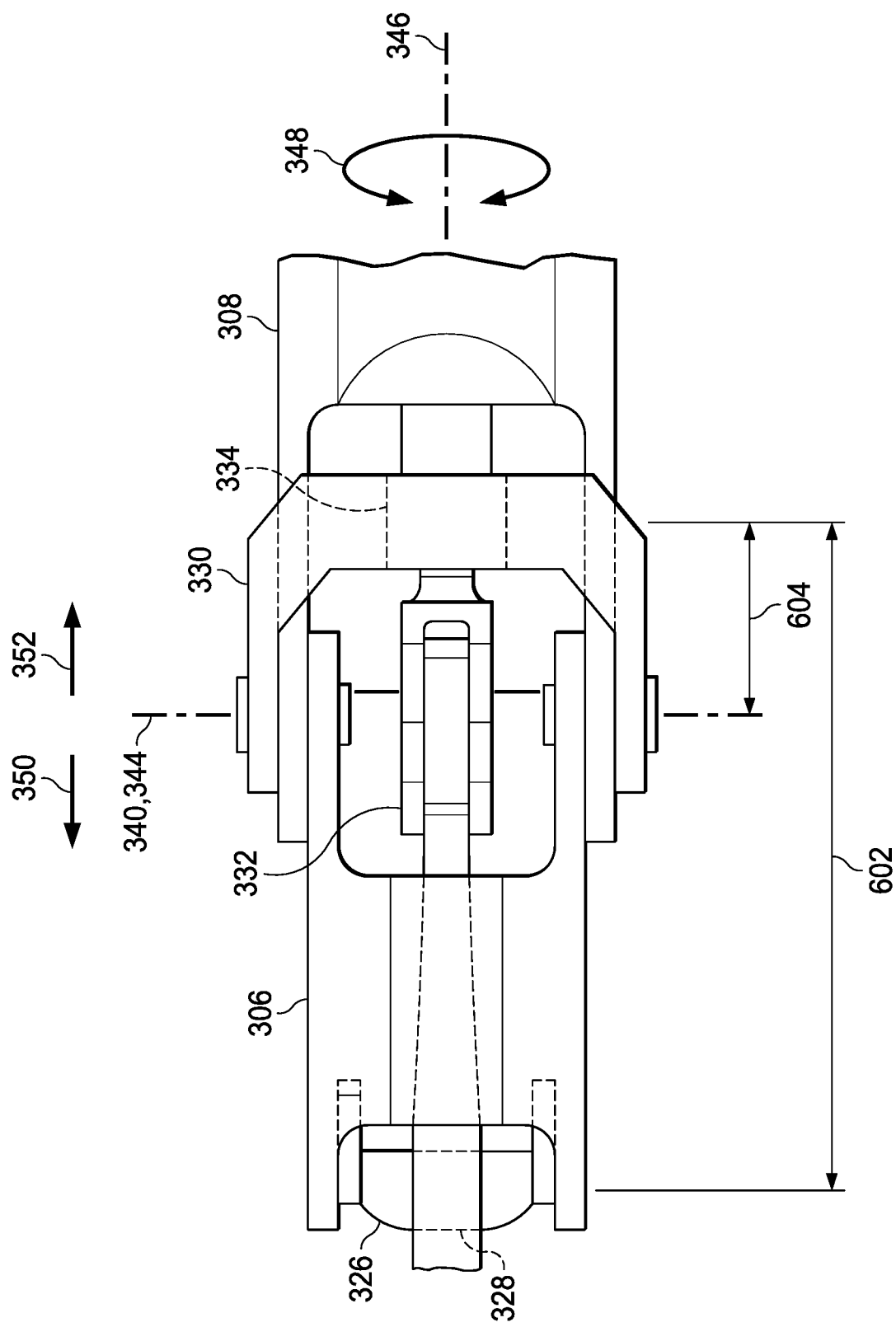
FIG. 6 is a schematic of a pivotal connection of a rotor blade according to one or more aspects of the disclosure.
Figure 9:
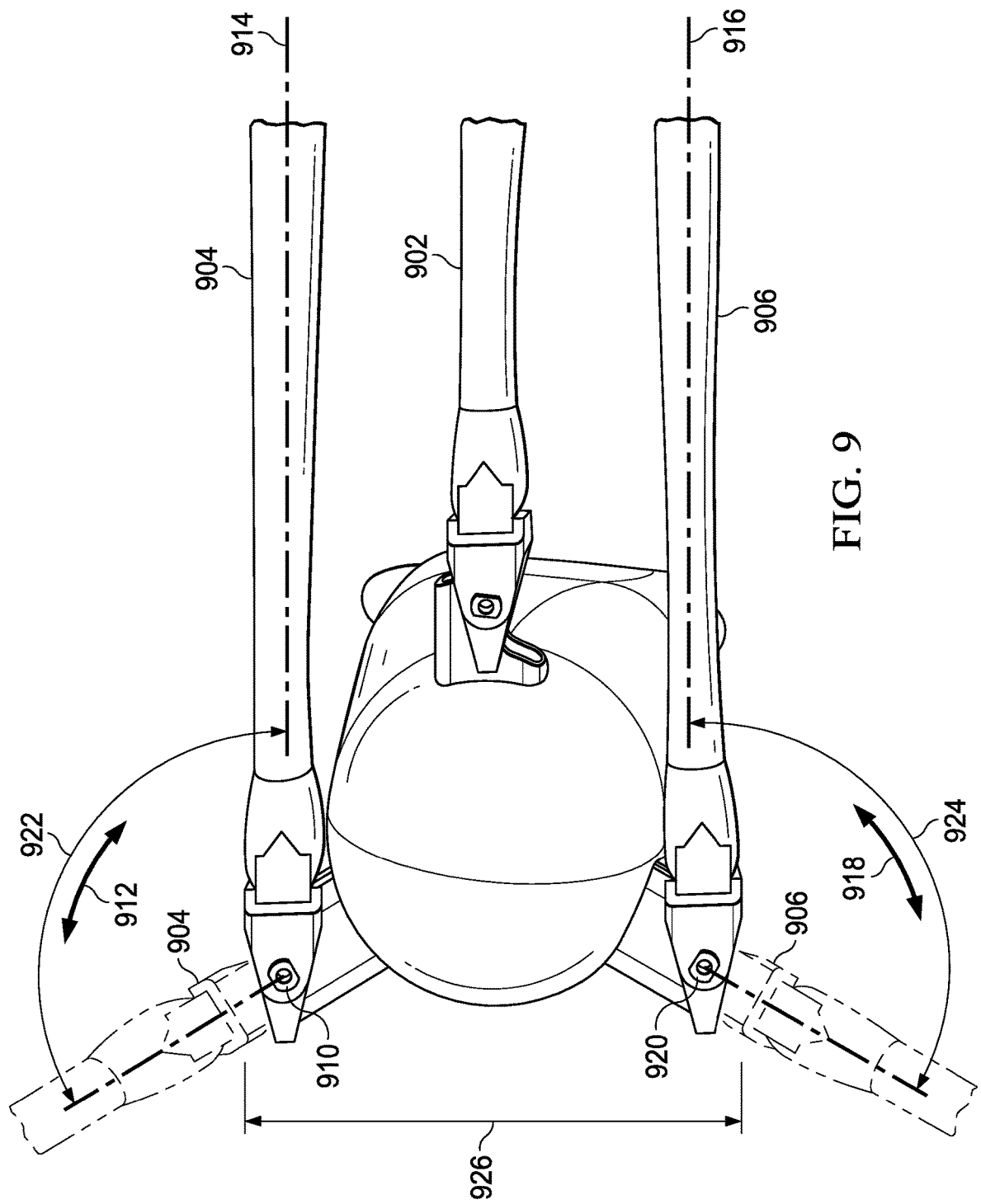
FIG. 9 is a top view of a rotor blade assembly in a folded position according to aspects of the disclosure.

FIG. 6 illustrates schematically that pivot axis 344 is inboard of outboard bearing 334. Rotor blade 308 is connected to grip 306 at a pivotal connection including pivot axis 340. Folding spindle 332 is connected to yoke 304 at a pivotal connection including pivot axis 344. Rotor blade 308 and grip 306 rotate or "pitch" in direction 348 around longitudinal axis 346. Rotor blade 308 is pitched until pivot axis 340 is collinear with pivot axis 344. Once pivot axis 340 is collinear with pivot axis 344, rotor blade 308 can be rotated or "folded" around the collinear pivot axes to a folded position (FIG. 9). Distance 602 is the spacing between inboard bearing 328 and outboard bearing 334. Distance 602 is an optimal distance between the inboard shear bearing and the outboard shear bearing for a rotor blade assembly of a particular aircraft. The distance is dependent on the particular aircraft's loads and dynamics. Collinear pivot axes 340, 344 are positioned inboard of outboard bearing 334. Pivot axes 340, 344 are located distance 604 in the inboard direction 350 from the outboard bearing 334 of rotor blade 308. Distances 602, 604 are measured along longitudinal axis 346.

Figure 7:
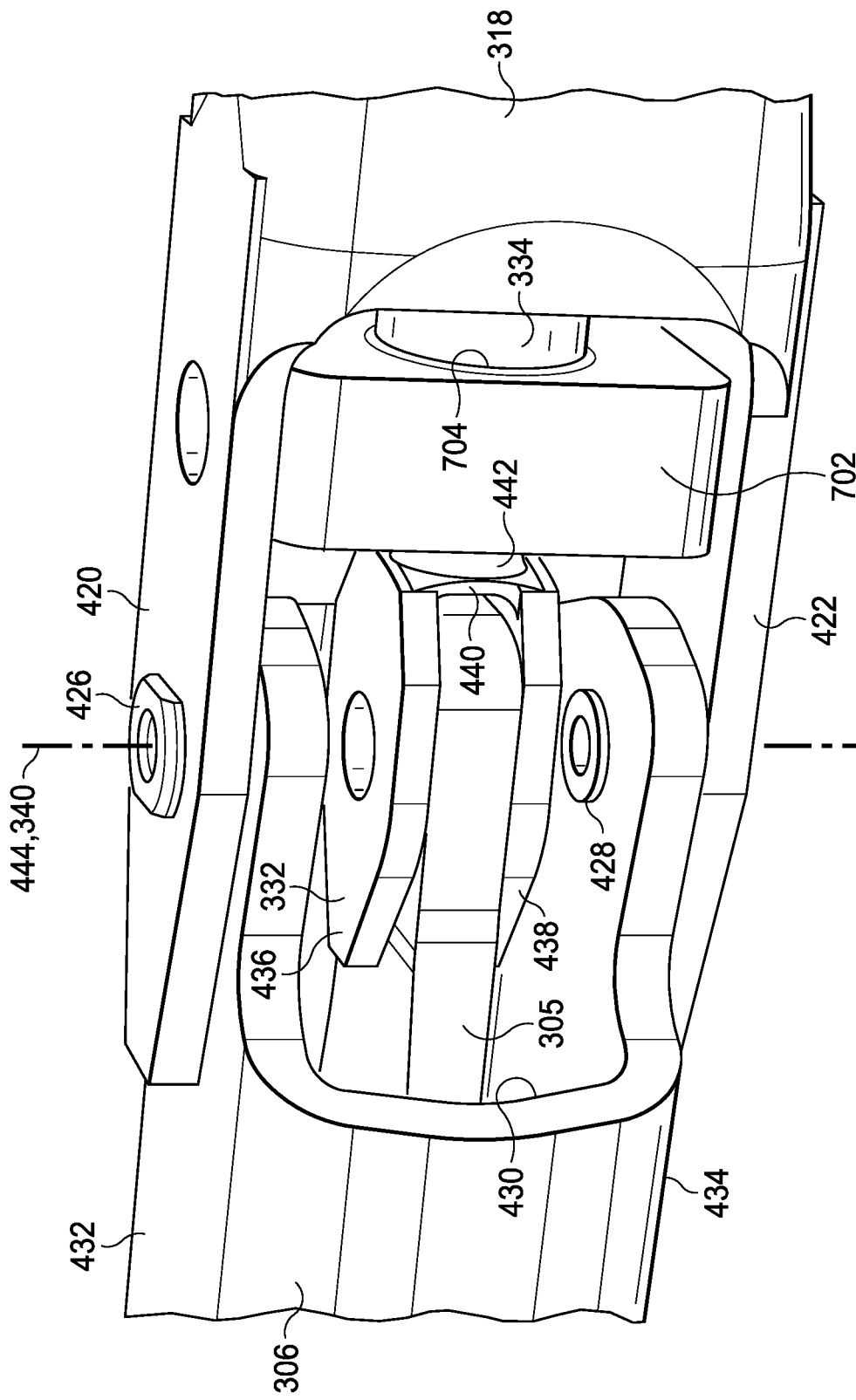
FIG. 7 is a partial perspective view of a pivotal connection of a rotor blade according to one or more aspects of the disclosure.

Referring to FIG. 7, an illustrative pivotal connection of a rotor arm to the yoke is shown. Cuff 318 includes blade tangs 420, 422. Outboard beam 702 is connected to cuff 318 between blade tangs 420, 422. Grip 306 defines cutout 430. Cutout 430 is positioned between surfaces 432, 434. Surfaces 432, 434 are exterior surfaces of grip 306. Blade bolts 426, 428 pivotally connect blade tangs 420, 422 to grip 306 at surfaces 432, 434. Blade tangs 420, 422 are exterior to grip 306. Blade bolts 426, 428 have a common central axis 444 that is collinear with pivot axis 340. Rotor blade 308 and outboard beam 702 are free to rotate together around pivot axis 340 with respect to grip 306.

Outboard beam 702 includes passage 704. Shaft 442 extends from bridge 440 through passage 704 to engage outboard bearing 334. Folding spindle 332 is pivotally connected to yoke arm 305 with a bolt including central axis 446 that is collinear with pivot axis 344. Folding spindle 332 may rotate around pivot axis 344 with respect to yoke arm 305. To reach a folded position (FIG. 9), pivot axes 340, 344 are collinear and the rotor blade, the outboard beam, the outboard bearing, and the folding spindle all rotate together with respect to the grip and the yoke.

Figure 8:
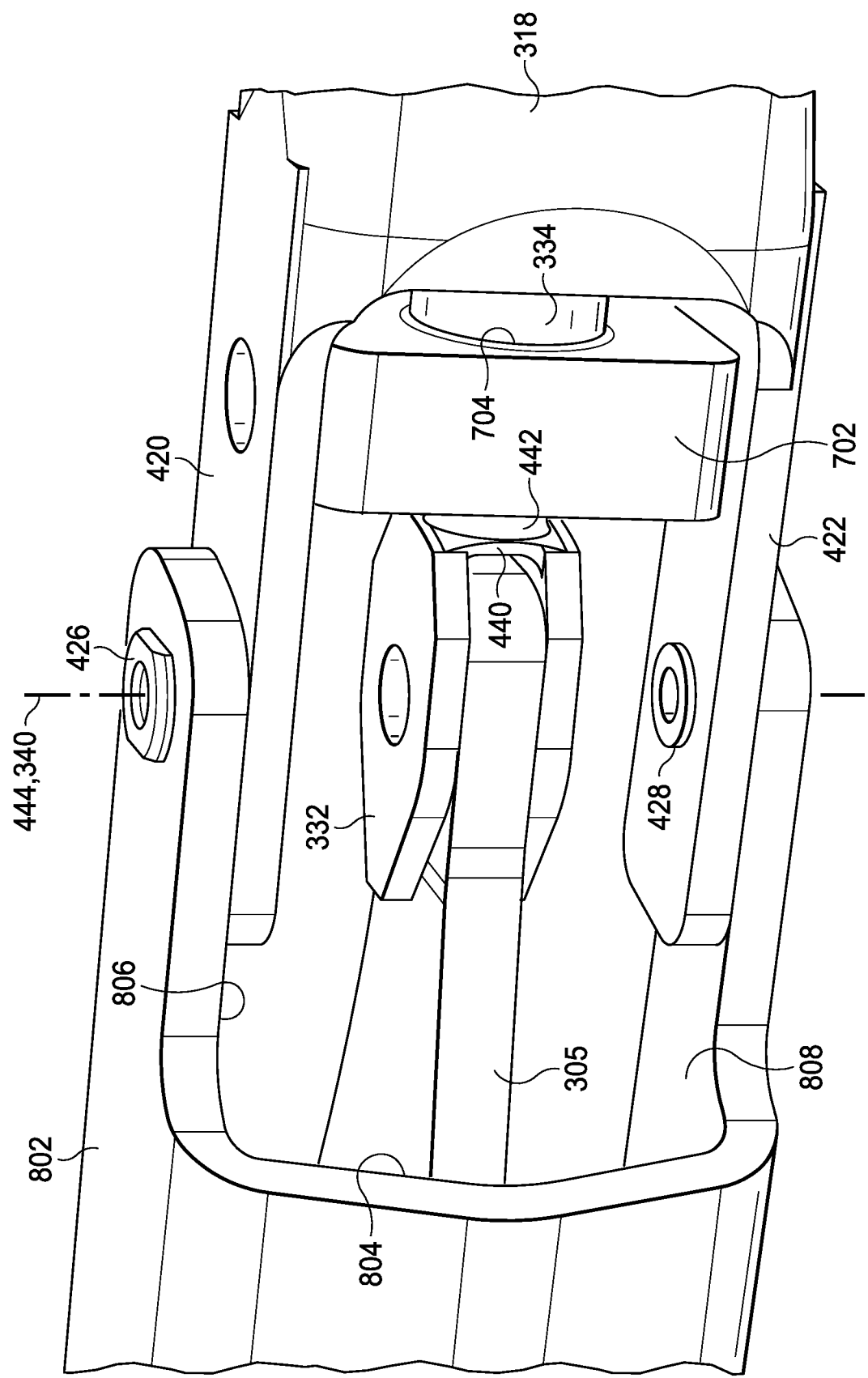
FIG. 8 is a partial perspective view of a pivotal connection of a rotor blade according to one or more aspects of the disclosure.

Referring to FIG. 8, an illustrative pivotal connection of a rotor arm to the yoke is shown. Cuff 318 includes blade tangs 420, 422. Outboard beam 702 is connected to cuff 318 between blade tangs 420, 422. Grip 802 defines cutout 804. Cutout 804 is positioned between surfaces 806, 808. Surfaces 806, 808 are interior surfaces of grip 802. Blade bolts 426, 428 pivotally connect blade tangs 420, 422 to grip 306 at surfaces 806, 808. Blade tangs 420, 422 are interior to grip 306. Blade bolts 426, 428 have a common central axis 444 that is collinear with pivot axis 340. Rotor blade 308 and outboard beam 702 are free to rotate together around pivot axis 340 with respect to grip 306.

Outboard beam 702 includes passage 704. Shaft 442 extends from bridge 440 through passage 704 to engage outboard bearing 334. Folding spindle 332 is pivotally connected to yoke arm 305 with a bolt including central axis 446 that is collinear with pivot axis 344. Folding spindle 332 may rotate around pivot axis 344 with respect to yoke arm 305. To reach a folded position (FIG. 9) pivot axes 340, 344 are collinear and the rotor blade, the outboard beam, the outboard bearing, and the folding spindle all rotate together with respect to the grip and the yoke.

Referring to FIG. 9, blade assembly 302 including rotor blades 902, 904, 906 is shown in a "folded" position. Unfolded rotor blade 904 and unfolded rotor blade 906 are depicted in shadow. Rotor blade 904 has longitudinal axis 914. Rotor blade 906 has longitudinal axis 916. Prior to rotating each rotor blade about pivot points 910, 920, each rotor blade is pitched around its longitudinal axis such that pivot axes 340, 344 become collinear. Collinear pivot axes 340, 344 provide pivot points 910, 920. Once pivot axes 340, 344 are collinear, rotor blade 904 is rotated in direction 912 at pivot point 910 around collinear pivot axes 340, 344 through angle 922. Rotor blade 906 is rotated in direction 918 at pivot point 920 around collinear pivot axes 340, 344 through angle 924. Actuators are operatively connected to the rotor blades to facilitate rotational movement of the rotor blades about the pivot points. Angles 922, 924 may be in the range of 90° to 180°. Physical stops or proximity sensors signal the actuators to cease rotational movement of the rotor blades. Pivot points 910 and 920 are positioned on longitudinal axes 914 and 916, respectively. Pivot points 910, 920 are positioned inboard of the outboard bearing 334 of each rotor blade. The pivot point of each rotor blade positioned inboard of the outboard bearing allows folded profile 926 to be less than if the pivot point were outboard of the outboard bearing.

Rotor blade 904 cannot rotate at pivot point 910 until lock mechanism 502 moves tab 504 from engagement with yoke arm 305. Rotor blade 906 cannot rotate at pivot point 920 until lock mechanism 502 moves tab 504 from engagement with yoke arm 305. Actuators are connected to lock mechanism to move the tabs free from engagement with the yoke arms.

Figure 10:
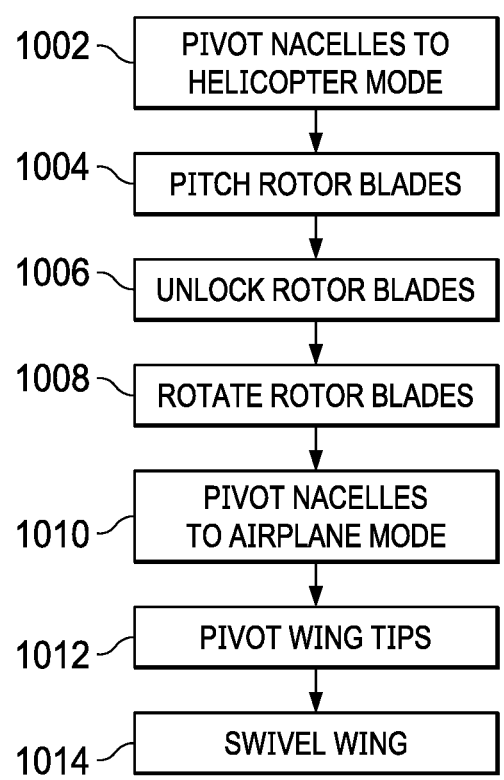
FIG. 10 is a flowchart of the actions performed in converting a tiltrotor aircraft from a flight ready position to a stowed position according to aspects of the disclosure.

Referring to FIG. 10, the actions performed in converting tiltrotor aircraft 100 from a flight ready position to a stowed position are shown. At block 1002, nacelles 115 and 117 which house rotor systems 114 and 116, respectively, are pivoted to helicopter mode. Each nacelle is rotated nose up to approximately 90° nacelle angle. A 90° nacelle angle is where the longitudinal axis of the nacelle is generally vertical relative to the ground. The blade assemblies of each rotor system are generally horizontal. At block 1004, each rotor blade is pitched about its longitudinal axis such that pivot axes 340 and 344 become collinear forming pivot points 910 and 920. In this position, the leading edge of each rotor blade is generally facing upward. This is referred to as indexing the rotor blades. Actuators operatively connected to the rotor blades facilitate the change in pitch of the rotor blades.

At block 1006, each folding spindle of each to-be-folded rotor blade is unlocked from it respective yoke arm. Actuators operatively connected to lock mechanism 502 facilitate temporary removal of tabs 504 from engagement with the yoke arms of each to-be-folded rotor blade. The position and quantity of identified to-be-folded rotor blades can vary depending on rotor blade assembly configuration (e.g., two of the three blades in the illustrated embodiment are folded). At block 1008, each to-be-folded rotor blade is rotated about the pivot axis provided by the collinear pivot axes 340, 344. Each rotor blade including its outboard beam, outboard bearing, and folding spindle is rotated relative to the grip and the yoke. Actuators operatively connected to the rotor blades facilitate the rotational movement of the rotor blades. The rotor blades are rotated toward the fuselage until the rotor blades are generally parallel with each other at which point physical stops or proximity sensors signal the actuators to cease movement of the rotor blades.

At block 1010, nacelles 115 and 117 are pivoted to airplane mode. Each nacelle is rotated to approximately 0° nacelle angle. A 0° nacelle angle is where the longitudinal axis of the nacelle is generally horizontal relative to the ground. The blade assemblies of each rotor system remain generally horizontal. At block 1012, wing tips 110 and 112 are pivoted toward the fuselage. At block 1014, wing 108 is swivelled about vertical axis 122 to lie above and generally align with the fuselage. The entire sequence of converting tiltrotor aircraft 100 from an operational flight ready position to a stowed position can be completed in a range of 1 to 2 minutes in a wind of up to at least 60 knots. It can be interrupted or stopped at any point to facilitate maintenance. Manual operation is possible in the event of a system failure. It is to be understood that several of the previous actions may occur simultaneously or in different order. The order of actions disclosed is not meant to be limiting.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A folding rotor blade assembly for a tiltrotor aircraft, comprising:
    a drive mast connected to a yoke;
    an inboard beam housing an inboard bearing, the inboard bearing connected to the yoke;
    an outboard beam housing an outboard bearing, the outboard bearing connected to the yoke outboard of the inboard bearing;
    a grip connected to the inboard beam;
    a rotor blade connected to the grip at a pivotal connection positioned inboard of the outboard bearing, the rotor blade comprising a first blade tang and a second blade tang connected to the grip at the pivotal connection; and
    the outboard beam connected to the rotor blade between the first blade tang and the second blade tang.

2. The folding rotor blade assembly of claim 1, further comprising a pair of axially aligned blade bolts at the pivotal connection providing a pivot axis of the rotor blade relative to the grip.

3. The folding rotor blade assembly of claim 1, wherein the outboard beam is connected to the rotor blade at the pivotal connection.

4. The folding rotor blade assembly of claim 3, further comprising:
   a folding spindle connected to the outboard bearing and connected to the yoke at a second pivotal connection; and
   a pivot axis of the pivotal connection is collinear with a second pivot axis of the second pivotal connection.

5. The folding rotor blade assembly of claim 1, further comprising:
   a pair of axially aligned blade bolts at the pivotal connection providing a pivot axis of the rotor blade relative to the grip;
   a folding spindle connected to the outboard bearing and connected to the yoke at a second pivotal connection providing a second pivot axis of the folding spindle relative to the yoke; and
   the pivot axis is collinear with the second pivot axis.

6. The folding rotor blade assembly of claim 1, further comprising:
   a folding spindle connected to the outboard bearing and connected to the yoke at a second pivotal connection; and
   a pivot axis of the pivotal connection is collinear with a second pivot axis of the second pivotal connection.

7. The folding rotor blade assembly of claim 1, wherein the outboard bearing further comprises an outboard shear bearing and an outboard centrifugal force ("CF") bearing.

8. The folding rotor blade assembly of claim 1, wherein the inboard bearing further comprises an inboard shear bearing.

9. The folding rotor blade assembly of claim 1, further comprising;
   a folding spindle connected to the outboard bearing and connected to the yoke at a second pivotal connection; and
   a lock connected to the folding spindle and releasably engaged with the yoke.

10. A folding rotor blade assembly, comprising:
    a yoke including a yoke arm extending radially from a central aperture;
    a clamp plate connected to the yoke proximate the central aperture;
    an inboard bearing connected to the clamp plate and connected to an inboard beam;
    a grip connected to the inboard beam;
    a folding spindle connected to the yoke arm at a first pivotal connection;
    an outboard bearing connected to the folding spindle and an outboard beam;
    a rotor blade comprising a first blade tang and a second blade tang connected to the grip at a second pivotal connection and the outboard beam connected to the rotor blade between the first blade tang and the second blade tang; and
    the first pivotal connection and the second pivotal connection positioned inboard of the outboard bearing.

11. The folding rotor blade assembly of claim 10, further comprising:
    a first pivot axis at the first pivotal connection;
    a pair of axially aligned blade bolts at the second pivotal connection providing a second pivot axis; and
    the first pivot axis is collinear with the second pivot axis.

12. The folding rotor blade assembly of claim 10, further comprising a lock connected to the folding spindle and releasably engaged with the yoke arm.

13. A method comprising:
    pitching a rotor blade of a rotor blade assembly comprising an inboard bearing connected to a yoke and a grip, an outboard bearing connected to the yoke at a first pivotal connection providing a first pivot axis, and a rotor blade connected to the grip at a second pivotal connection providing a second pivot axis inboard of the outboard bearing, the rotor blade having a first blade tang and a second blade tang connected to the grip at the second pivotal connection and the rotor blade connected to an outboard beam between the first blade tang and the second blade tang; and
    rotating the rotor blade together with the outboard bearing around the first pivot axis and the second pivot axis.

14. The method of claim 13, wherein pitching the rotor blade includes axially aligning the first pivot axis with the second pivot axis.

15. The method of claim 14 wherein the first pivot axis and the second pivot axis are both inboard of the outboard bearing.

16. The method of claim 13, wherein the outboard bearing further comprises an outboard shear bearing and an outboard centrifugal force ("CF") bearing.

17. The method of claim 13, further comprising a pair of axially aligned blade bolts at the second pivotal connection.

* * * * *